(12) United States Patent
Willberg et al.

(10) Patent No.: US 8,281,857 B2
(45) Date of Patent: Oct. 9, 2012

(54) METHODS OF TREATING SUBTERRANEAN WELLS USING CHANGEABLE ADDITIVES

(75) Inventors: Dean Michael Willberg, Salt Lake City, UT (US); James G. Carlson, Lake Elmo, MN (US); Ignatius A. Kadoma, Cottage Grove, MN (US); Yong K. Wu, Woodbury, MN (US); Michael D. Crandall, North Oaks, MN (US)

(73) Assignees: 3M Innovative Properties Company, Saint Paul, MN (US); Schlumberger Technology Corporation, Sugar Land, TX (US)

( * ) Notice: Subject to any disclaimer, the term of this patent is extended or adjusted under 35 U.S.C. 154(b) by 145 days.

(21) Appl. No.: 12/808,115

(22) PCT Filed: Dec. 5, 2008

(86) PCT No.: PCT/US2008/085663
§ 371 (c)(1),
(2), (4) Date: Jun. 14, 2010

(87) PCT Pub. No.: WO2009/079234
PCT Pub. Date: Jun. 25, 2009

(65) Prior Publication Data
US 2010/0288495 A1    Nov. 18, 2010

Related U.S. Application Data

(60) Provisional application No. 61/014,000, filed on Dec. 14, 2007.

(51) Int. Cl.
*E21B 43/22* (2006.01)
(52) U.S. Cl. ............... 166/279; 166/278; 166/280.1; 166/300; 166/302; 166/305.1
(58) Field of Classification Search .................. None
See application file for complete search history.

(56) References Cited

U.S. PATENT DOCUMENTS

| | | |
|---|---|---|
| 4,406,850 A | 9/1983 | Hills |
| 4,684,570 A | 8/1987 | Malaney |
| 4,690,503 A | 9/1987 | Janssen |
| 4,732,809 A | 3/1988 | Harris, Jr. |
| 4,756,786 A | 7/1988 | Malaney |
| 4,770,925 A | 9/1988 | Uchikawa |
| 4,774,124 A | 9/1988 | Shimalla |
| 5,017,268 A | 5/1991 | Clitherow |
| 5,094,604 A | 3/1992 | Chavez |
| 5,162,074 A | 11/1992 | Hills |
| 5,185,204 A | 2/1993 | Shimizu |
| 5,225,201 A | 7/1993 | Beaurline |
| 5,302,443 A | 4/1994 | Manning |
| 5,330,005 A | 7/1994 | Card |
| 5,380,477 A | 1/1995 | Kent |
| 5,411,693 A | 5/1995 | Wust, Jr. |
| 5,439,055 A | 8/1995 | Card et al. |
| 5,456,982 A | 10/1995 | Hansen |
| 5,458,472 A | 10/1995 | Kobayashi |
| 5,460,884 A | 10/1995 | Kobylivker |
| 5,501,274 A | 3/1996 | Nguyen |
| 5,501,275 A | 3/1996 | Card |
| 5,540,992 A | 7/1996 | Marcher |
| 5,551,514 A | 9/1996 | Nelson |
| 5,591,199 A | 1/1997 | Porter |
| 5,593,768 A | 1/1997 | Gessner |
| 5,618,479 A | 4/1997 | Lijten |
| 5,631,085 A | 5/1997 | Gebauer |
| 5,633,082 A | 5/1997 | Berger |
| 5,641,584 A | 6/1997 | Andersen |
| 5,667,864 A | 9/1997 | Landoll |
| 5,672,419 A | 9/1997 | Mukaida |
| 5,698,322 A | 12/1997 | Tsai |
| 5,714,256 A | 2/1998 | DeLucia |
| 5,733,825 A | 3/1998 | Martin |
| 5,756,625 A | 5/1998 | Crandall |
| 5,759,926 A | 6/1998 | Pike |
| 5,765,256 A | 6/1998 | Allan et al. |
| 5,776,838 A | 7/1998 | Dellinger |
| 5,786,059 A | 7/1998 | Frank |
| 5,798,305 A | 8/1998 | Horiuchi |
| 5,871,049 A | 2/1999 | Weaver |

(Continued)

FOREIGN PATENT DOCUMENTS

CN    1936127    3/2007
(Continued)

OTHER PUBLICATIONS

ASTM Designation: D 1895-96, "Standard Test Methods for Apparent Density, Bulk Factor, and Pourability of Plastic Materials", 2010, pp. 1-5. ASTM Designation: D 3418-03, "Standard Test Method for Transition Temperatures of Polymers by Differential Scanning Calorimetry", 2004, pp. 331-337.
European Chemical News, vol. 54, No. 1426, p. 35, (Jun. 11, 1990).
"Factors Influencing the Release Profile from a Multiparticulate Delivery System", Amherst, NY, [online], [retrieved from the internet on May 13, 2011], Published on Mar. 27, 2003, IP.com No. 000011953D, <www.ip.com>, 3 pages.
"Factors Influencing the Physical Characteristics of Tablets", [online], [retrieved from the internet on May 13, 2011], Published on Aug. 12, 2003, IP.com No. 000018809D, <www.ip.com>, 2 pages.
Fibres, High Performance Textiles, p. 1-2, (Aug. 1993).
"Flame Retardants: The Bromine Controversy", Plastics Compounding, vol. 16, No. 5, pp. 29-40, (Sep./Oct. 1993).
Garg, "Biconstituent Fibres of Nylon 6-Poly(ethylene terephthalate)" Die Angewandte Makromolekulare Chemie, vol. 90, No. 1319, pp. 57-68, (1980).

(Continued)

*Primary Examiner* — Zakiya W Bates
(74) *Attorney, Agent, or Firm* — Mueting, Raasch & Gebhardt, P.A.

(57) ABSTRACT

Fluid compositions and methods of making and using same are described, one composition comprising a well treatment fluid and an additive combined with the well treatment fluid, wherein the additive is selected from solids, liquids and combinations thereof, the additive having a surface shape, at least one property of the surface shape enabling it to change under influence of a controllable parameter after the composition is deployed into a hydraulic fracture or gravel pack. In methods of the disclosure, the additive exists initially in a first state, and then is changed to a second state. The first state may increase proppant flowback efficiency, while the second state may increase hydraulic conductivity. In certain embodiments, the additive may change back to its first state.

20 Claims, 3 Drawing Sheets

U.S. PATENT DOCUMENTS

| | | | |
|---|---|---|---|
| 5,891,119 | A | 4/1999 | Ta |
| 5,902,679 | A | 5/1999 | Kojima |
| 5,945,134 | A | 8/1999 | Strait |
| 5,972,463 | A | 10/1999 | Martin et al. |
| 5,989,004 | A | 11/1999 | Cook |
| 6,059,034 | A | 5/2000 | Rickards |
| 6,114,410 | A | 9/2000 | Betzold |
| 6,156,842 | A | 12/2000 | Hoenig |
| 6,169,058 | B1 | 1/2001 | Le et al. |
| 6,172,011 | B1 | 1/2001 | Card |
| 6,207,276 | B1 | 3/2001 | Spindler |
| 6,258,304 | B1 | 7/2001 | Bahia |
| 6,309,669 | B1 | 10/2001 | Setterstrom et al. |
| 6,391,443 | B1 | 5/2002 | Terada |
| 6,417,121 | B1 | 7/2002 | Newkirk |
| 6,444,600 | B1 | 9/2002 | Baek |
| 6,528,157 | B1 | 3/2003 | Hussain |
| 6,689,242 | B2 | 2/2004 | Bodaghi |
| 6,732,800 | B2 | 5/2004 | Acock |
| 6,767,498 | B1 | 7/2004 | Talley, Jr. |
| 6,783,852 | B2 | 8/2004 | Inada |
| 6,875,506 | B2 | 4/2005 | Husemann |
| 7,132,108 | B1 | 11/2006 | Yang et al. |
| 7,767,298 | B2 | 8/2010 | Nakatsuka |
| 2004/0092191 | A1 | 5/2004 | Bansal et al. |
| 2004/0261995 | A1 | 12/2004 | Nguyen et al. |
| 2005/0161411 | A1 | 7/2005 | Boner |
| 2005/0274517 | A1 | 12/2005 | Blauch |
| 2006/0032633 | A1 | 2/2006 | Nguyen |
| 2006/0035790 | A1 | 2/2006 | Okell |
| 2006/0063457 | A1 | 3/2006 | Matsui |
| 2006/0185848 | A1 | 8/2006 | Surjaatmadja et al. |
| 2006/0199006 | A1 | 9/2006 | Poon |
| 2007/0044958 | A1 | 3/2007 | Rytlewski |
| 2008/0317984 | A1 | 12/2008 | Yamashita |
| 2009/0068463 | A1 | 3/2009 | Mochizuki |
| 2010/0263865 | A1 | 10/2010 | Willberg et al. |
| 2010/0263870 | A1 | 10/2010 | Willberg et al. |
| 2010/0282468 | A1 | 11/2010 | Willberg et al. |

FOREIGN PATENT DOCUMENTS

| | | |
|---|---|---|
| CN | 1949007 | 4/2007 |
| DE | 102005048442 | 4/2007 |
| EA | 200601465 A1 | 4/2007 |
| EP | 0089113 | 9/1983 |
| EP | 122827 | 10/1984 |
| EP | 138549 | 4/1985 |
| EP | 140415 | 5/1985 |
| EP | 159635 | 10/1985 |
| EP | 165817 | 12/1985 |
| EP | 171806 | 2/1986 |
| EP | 248598 | 12/1987 |
| EP | 260607 | 3/1988 |
| EP | 518690 | 12/1992 |
| EP | 538047 | 4/1993 |
| EP | 704001 | 12/1994 |
| EP | 906824 | 4/1999 |
| EP | 906972 | 4/1999 |
| EP | 929701 | 7/1999 |
| EP | 955404 | 11/1999 |
| EP | 963468 | 12/1999 |
| EP | 963472 | 12/1999 |
| EP | 991799 | 4/2000 |
| EP | 1290255 | 3/2003 |
| EP | 1300511 | 4/2003 |
| EP | 1326003 | 7/2003 |
| EP | 1373607 | 1/2004 |
| EP | 1466044 | 10/2004 |
| EP | 1476596 | 11/2004 |
| EP | 1 589 137 A1 | 9/2005 |
| EP | 1 577 426 A1 | 10/2005 |
| GB | 2319265 | 5/1998 |
| GB | 2337227 | 11/1999 |
| IE | 057094 | 4/1992 |
| JP | 4648725 | 9/2006 |
| JP | 2007084946 | 4/2007 |
| JP | 2007084954 | 4/2007 |
| JP | 2007084958 | 4/2007 |
| JP | 2007090913 | 4/2007 |
| JP | 2007091260 | 4/2007 |
| JP | 2007092229 | 4/2007 |
| JP | 2007092236 | 4/2007 |
| JP | 2007092266 | 4/2007 |
| JP | 2007105184 | 4/2007 |
| JP | 2007105185 | 4/2007 |
| JP | 2007107123 | 4/2007 |
| JP | 2007107126 | 4/2007 |
| JP | 2007107143 | 4/2007 |
| JP | 2007107144 | 4/2007 |
| JP | 2007113143 | 5/2007 |
| JP | 2007113153 | 5/2007 |
| JP | 2007113158 | 5/2007 |
| JP | 2007119975 | 5/2007 |
| JP | 2007119976 | 5/2007 |
| JP | 2007119977 | 5/2007 |
| RU | 2257465 | 4/2005 |
| WO | WO 9429506 | 12/1994 |
| WO | WO 9634134 | 10/1996 |
| WO | WO 9637644 | 11/1996 |
| WO | WO 9814647 | 4/1998 |
| WO | WO 9826118 | 6/1998 |
| WO | WO 9927229 | 6/1999 |
| WO | WO 0129295 | 4/2001 |
| WO | WO 0190464 | 11/2001 |
| WO | WO 0244447 | 6/2002 |
| WO | WO 03/027431 A2 | 4/2003 |
| WO | WO 03069039 | 8/2003 |
| WO | WO 2005/078235 A1 | 8/2005 |
| WO | WO 2007046052 | 4/2007 |
| WO | WO 2007046296 | 4/2007 |
| WO | WO 2007047844 | 4/2007 |
| WO | WO 2007049522 | 5/2007 |

OTHER PUBLICATIONS

Hong, Jet-Assisted Aerosol CVD for Multicomponent Particle Deposition, Chemical Vapor Deposition, vol. 12, pp. 627-630, (2006).
"Multi-Polymer Formulation", Amherst, NY, [online], [retrieved from the internet on May 13, 2011], Published on Jun. 28, 2004, IP.com No. 000029440D, <www.ip.com>, 2 pages.
Sevčenko, "Electrical Properties of Polymer Composite Structures Comprising Conductive Fibers", Plastics and Rubber with Section Coating Materials, vol. 32, No. 11, pp. 401-407, 1985.
Strauch, "Multi-component Injection Molding", Plastic Processor, vol. 36, No. 5, pp. 57-62, 1985.
"Sustained Release Formulations with Ciprofloxacin", Amherst, NY, [online], [retrieved from the internet on May 13, 2011], Published on Dec. 22, 2006, IP.com No. 000144216D, <www.ip.com>, 2 pages.
"Sustained Release Formulations with Gliclazide", Amherst, NY, [online], [retrieved from the internet on May 13, 2011], Published on Nov. 29, 2005, IP.com No. 000132029D, <www.ip.com>, 2 pages.
"Trützschler: To Listen to the Market Leads to Success", International Textile Bulletin, Feb. 2001, pp. 28-34.
International Search Report for Int'l Appln. No. PCT/US2008/086313, 4 pages.
Written Opinion of the ISA for Int'l Appln. No. PCT/US2008/086313, 4 pages.
International Search Report for Int'l Appln. No. PCT/US2008/086323, 4 pages.
Written Opinion of the ISA for Int'l Appln. No. PCT/US2008/086323, 4 pages.
U.S. Appl. No. 12/747,985, filed Jun. 14, 2010, Carlson.
U.S. Appl. No. 12/808,013, filed Jun. 14, 2010, Carlson.
U.S. Appl. No. 12/808,121, filed Jun. 14, 2010, Willberg et al.
U.S. Appl. No. 12/808,128, filed Jun. 14, 2010, Willberg et al.
U.S. Appl. No. 12/808,117, filed Jun. 14, 2010, Willberg et al.
*American Petroleum Institute Method RP56*, "Recommended Practices for Testing Sand Used in Hydraulic Fracturing operations," Section 5, Second Edition, Dec. 1, 1995; 12 pgs.
International Search Report issued by the Korean Intellectual Property Office on Jul. 17, 2009 for related Patent Application No. PCT/US2008/085663, 2 pgs.
Written Opinion issued by the Korean Intellectual Property Office on Jul. 16, 2009 for related Patent Application No. PCT/US2008/085663, 4 pgs.
International Preliminary Report on Patentability issued Jun. 15, 2010 by the International Bureau of WIPO for related Patent Application No. PCT/US2008/085663, 5 pgs.

METHODS OF TREATING SUBTERRANEAN WELLS USING CHANGEABLE ADDITIVES

This application is the §371 U.S. National Stage of International Application No. PCT/US2008/085663, filed 5 Dec. 2008, which claims the benefit of U.S. Provisional Application No. 61/014,000, filed 14 Dec. 2007, both of which are hereby incorporated by reference in their entireties.

BACKGROUND

This disclosure relates to methods for recovery of hydrocarbons from subterranean wells employing one or more well treatment fluids.

Compositions and methods useful for modifying the near wellbore region of a hydraulic fracture—proppant flowback control in particular—are not all successful. Many proppant flowback control methods involve the addition of a resin, a tackifying material, fibers, or deformable particles into the sandpack with the intent of increasing the particle-particle (and particle-wall friction) and preventing the individual sand or proppant grains from becoming entrained into the fluid phase and produced back into the wellbore. Although these methods can successfully control proppant flowback, it often comes at the cost of reduced fracture conductivity since these added proppant flowback control materials may take up space in the porous pack, occupy some of the pore throats, or reduce the proppant pack permeability.

Due to changes in formation fluid flow rate, formation fluid composition and phase, the need for proppant flowback control can diminish with time. Often proppant flowback control is needed only during the first few days to weeks after formation of a hydraulic fracture, when the flow rate of formation fluid is the highest. Frequently the proppant pack experiences its greatest stress during the first few hours of clean-up, when the broken fluid is flowing back at a high rate and fracture closure has not reached equilibrium. Also, many gas wells have steep decline curves—very high rates of gas production during the first few months falling off as the formation pressure drops.

Therefore, there remains a significant and as yet unmet need in the art for methods of treating subterranean formations intersected by a wellbore, and methods of completing a wellbore, that control proppant flowback employing a changeable additive or additives having good proppant flowback control properties but has minimal long-term damage to the proppant pack hydraulic conductivity.

SUMMARY

In accordance with the present disclosure, methods of completing or otherwise treating a subterranean formation are described which provide improved control or reduction of particulate migration, transport or flowback in wellbores and reservoirs, and which may do so without sacrificing substantial hydraulic conductivity.

A first aspect of the disclosure is a method of completing a wellbore comprising: (a) injecting a well treatment composition into the wellbore, the composition comprising a well treatment fluid and an additive, the additive in the composition having an external surface shape; and (b) modifying at least one property of the external surface shape of the additive after injecting the composition into the wellbore by controlling a parameter.

Methods within this aspect of the disclosure include those wherein the at least one property is selected from the group consisting of dissolution rate, sublimation pressure, solubility, vapor pressure, phase, percent crystallinity, volume, shape, density, porosity, modulus, viscosity, tackiness, degree of hydrolysis, chemical functionality, and combinations thereof.

Other methods within this aspect of the disclosure include those wherein the additive is a composite additive selected from the group consisting of: combinations of two or more chemical components, combinations of two or more phases of the same component, and combinations of two or more phases of two or more components. Composite additives useful in the disclosure may comprise at least one polymeric particle.

The composite additive may comprise a fluid, such as a solvent. If a solvent is employed, the solvent may swell one or more other portions of the additive, and removal of at least a portion of the solvent may reduce swelling of one or more portions of the additive. Solvents useful in the disclosure may be selected from normal and branched alkanes, alkyl halides, alcohols, ethers, thiols, sulfides, alkenes, alkynes, aldehydes, ketones, carboxylic acids, derivatives of carboxylic acids (such as esters, amides, acyl halides, acid anhydrides, nitriles, and the like), aromatic ring compounds, non-aromatic ring compounds, difunctional compounds, amines and other nitrogen-containing compounds (such as aromatic nitrogen compounds); aromatic carbonyl compounds and sulfonic acids; phenols, phenyl ethers, and quinones; polycyclic aromatic hydrocarbons; heterocyclic compounds (such as furans, pyrroles, and thiophenes), and others. Examples of these may include mono-, di-, tri, and polybasic esters, such as ethyl lactate, ethylacetate, and the like; ketones, such as acetone, acetylacetone, methyl ethyl ketone, and the like; normal and branched chain alcohols, such as methanol, ethanol, isopropanol, and the like; aromatic solvents and derivatives thereof, such as benzene, toluene, xylene, styrene, divinylbenzene, and the like; amides such as dimethylformamide; N-methylpyrrolidone, chloroform, ethylene carbonate, dimethylsulfoxide, dimethylacetamide, methylene chloride, tetrahydrofuran, furfuryl alcohol, and mixtures of thereof.

In certain methods, the composite additive may comprise a soluble species. The soluble species may be partially or wholly encapsulated.

Yet other methods may further comprise performing at least some processing of the additive in proximity to the wellbore prior to injecting.

In certain methods, the composition may comprise a proppant.

Other methods within this aspect of the disclosure include those wherein the additive or a portion of the additive modifies upon exposure to at least one condition selected from the group consisting of: washing by solution having a controllable flow rate, or a controllable composition or both; upon passage of at least one controlled time period; upon controlled application of heat; upon controlled application of pressure; upon controlled modification of a treatment fluid; upon exposure to a formation fluid; simultaneous combinations thereof; and sequential combinations thereof.

As used herein the term "well treatment composition" may include stimulation fluids, fracturing fluids, wash fluids, acidizing fluids, completion fluids, and the like. Well treatment compositions may be water-based, oil-based, or mixture thereof, and may comprise any number of liquid and solid sub-components, to be discussed more fully herein, for example, water, organic chemicals, surfactants, rheology modifiers, salts, polymer compositions, fibers, curing agents, tackifying agents, and the like. A well treatment composition may or may not contain proppant and it may or may not be foamed. The term "subterranean fluid" means a native fluid emanating from an underground geological formation. The term "residual well treatment fluid" means fluid recovered after use in an underground geological formation, and may comprise well treatment fluids and subterranean fluids.

As used herein the term "additive" means a material that is at least partially compatible with a well treatment fluid and has an external surface, the external surface having a shape, at least a portion of the external surface shape having at least one property modifiable after the composition is injected into the wellbore by controlling a parameter. As used herein the term "external surface shape" means a 3-dimensional structural portion of the additive having a shape and size, a major area of the structural portion which may be exposed to at least one modifying parameter. In certain embodiments described herein, such as additive particles in the form of solvent-swellable beads, pellets, or other shaped articles, the 3-dimensional structure may comprise substantially the entire additive particle. In certain embodiments, only the external shape may change. In certain other embodiments, only the external surface size may change. In yet other embodiments, both the external surface shape and size may change. Exemplary additives have at least one identified property of their external surface shape modifiable after the composition is injected into the wellbore by controlling a parameter. The meaning of the phrase "modifiable after the composition is injected by controlling a parameter" will become more evident in the following description, but examples may be selected from dissolution rate, sublimation pressure, solubility, vapor pressure, percent crystallinity, volume, shape, density, porosity, modulus, viscosity, tackiness, degree of hydrolysis, chemical functionality, and combinations thereof. The change may, for example, be effected by a wash solution (both flow rate and composition of which may be controlled), the passage of at least one controlled time period, the controlled application of heat, simultaneous combinations thereof, and sequential combinations thereof. The "change" may be engineered to occur suddenly or gradually, as desired. The change may be for the entire external surface of the additive, or for a portion of the external surface thereof. For example, if the additive is a solid, a portion of or the entire external surface may sublime, while interior portions or layers may remain unchanged.

Useful additives may be those able to change their external surface shape between at least two states. When the external surface shape (or a portion thereof) is in a second state the additive may termed a modified additive. The first state of the additive is designed to exhibit high proppant flowback control efficiency. This state lasts for a designed length of time, which is determined by at least one controllable property of the additive's external shape and by the chemical and physical environment within the hydraulic fractures. Change of the external surface shape of the additive to a second state may be affected by a chemical, physical, thermal or combination thereof treatment. The second state is one where the modified additive has, in certain embodiments, no negative impact (in certain embodiments, limited negative impact) on the hydraulic conductivity of fractures. In this second state the additive may retain some additional positive benefits by acting as a material to capture and limit the mobility of formation fines, or by acting as a reservoir for controlled release of beneficial chemicals. The second state may be reactivated into the first state by a chemical, physical, thermal or combination of treatments, such as a wash treatment.

Additives useful in the disclosure may include those wherein the external surface shape may be designed so that the lifetime of the first state of the additive may be tuned for different subterranean conditions in different fractures. The tuning is possible by the judicious selection of at least one specific material property of the external surface shape of the particular additive for the given treatment, such as dissolution rate, sublimation pressure, solubility, vapor pressure, percent crystallinity, volume, density, porosity, modulus, viscosity, tackiness, degree of hydrolysis, and chemical functionality.

Additives useful in the disclosure may be fabricated using a process wherein the final fabrication step may take place either at the local district or at the location in the field where the additive will ultimately be used. This later fabrication step is important for extending the utility of the disclosed compositions and methods as the properties of the external surface shape of the additive may be locally tuned to the specific needs of the treatment at hand. This feature of the disclosure can simplify manufacturing streams and local inventory requirements.

A second aspect of the disclosure is a method of treating a subterranean formation intersected by a wellbore, comprising: (a) providing a well treatment composition comprising a well treatment fluid and an additive, the additive in the composition having an external surface shape; (b) injecting the well treatment composition into a wellbore; (c) contacting the subterranean formation with the well treatment composition; and (d) modifying at least one property of the external surface shape of the additive after injecting the composition into the wellbore by controlling a parameter. Methods within this aspect of the disclosure include those wherein the modifying occurs at a controlled rate. In certain methods, after first modifying the at least one property of the external surface shape of the additive, the external surface shape of the additive may be further modified. The further modifying and the first modified property may or may not be the same property. In certain methods, the additive external surface shape is substantially the same as prior to the first modification after the further modifying.

In certain methods, the modifying may be upon exposure to a condition selected from washing by solution having a controllable flow rate or a controllable composition, or both; upon passage of one or more controlled time periods; upon controlled application of or exposure to heat; upon controlled application of or exposure to pressure; upon controlled modification of treatment fluid; upon exposure to formation fluid; simultaneous combinations thereof; and sequential combinations thereof.

As in methods within the first aspect of the disclosure, the additive may be a composite material, or the composite material may comprise a soluble species, and the modifying comprises exposing the additive to a solubilizing fluid. The soluble material may be partially or wholly encapsulated by an encapsulant, and the exposing the additive to a solubilizing fluid may degrade at least a portion of the encapsulant. The additive may comprise a solvent, and modifying the additive may comprise exposing at least the external surface shape of the solvent-swelled additive to a fluid able to remove at least a portion of the solvent.

Methods within the second aspect of the disclosure include those wherein the modifying is chemical and further comprises providing a fluid to chemically modify at least a portion of the external surface shape of the additive. Other methods include those wherein the subterranean formation comprises a fluid, the method further comprising exposing the additive to the formation fluid to modify the additive. Certain methods may comprise performing at least some processing of the additive in proximity to the wellbore.

A third aspect of the disclosure comprises: (a) providing a well treatment fluid comprising a liquid component and a solid component; (b) combining the well treatment fluid with an additive to form a well treatment composition, the additive in the composition having an external surface shape; (c) injecting the well treatment composition into a wellbore, the wellbore intersecting a subterranean formation; (d) forming a pack comprising the solid component and the additive at a desired location in the wellbore or formation; and (e) modifying at least one property of the external surface shape of the additive after injecting the composition into the wellbore by controlling a parameter.

The modifying may occur at a controlled rate, and may occur automatically without further intervention. In certain methods, after first modifying the at least one property of the external surface shape of the additive, the external surface shape of the additive may be further modified. The further modifying and the first modified property may or may not be the same property. In certain methods, the additive external surface shape is substantially the same as prior to the first modification after the further modifying.

Methods include those wherein the solid component comprises particles, and methods wherein the additive is a composite additive selected from combinations of at least two chemical components, combinations of at least two phases of the same component, and combinations of at least two phases of at least two components. Yet other methods within this aspect include those wherein the composite additive comprises at least one polymeric particle. Yet other methods include those wherein the additive comprises a solvent, and methods wherein the modifying comprises removal of at least a portion of the solvent, and methods wherein the solvent is selected from solvents mentioned herein above. The formation may comprise formation fluid, and the modifying may occur upon exposure to the formation fluid.

Methods include those wherein the additive comprises a trigger, and wherein the modifying occurs upon exposure to a triggering mechanism.

In certain other methods the well treatment fluid may be a fracturing fluid, the step of injecting is performed at a pressure sufficient to create fractures in the subterranean formation, the particles may comprise proppant, and the pack is a proppant pack formed in at least one fracture.

In other methods within this aspect of the disclosure, the well treatment fluid is a gravel pack fluid for forming the pack, and the pack is a gravel pack formed at a desired location in the wellbore or a near wellbore region.

Well treatment methods within the disclosure include those methods wherein a pack is formed in a desired location in a wellbore or near wellbore prior to changing the additive from the first state to the second state. Variants of this embodiment include those wherein the pack is formed of the solid component; methods wherein after the additive changes from a first state to a second state, the additive subsequently (after at least one controllable time period) changes back from the second state to the first state; and methods wherein the reversal of the change in the state of the additive is effected by a chemical wash. In these embodiments the additive may be a composite material. The change of the additive from a first state to a second state may be a change in volume (such as a reduction of volume), change in chemical composition (which may include a change in properties such as tackiness), a change in porosity resulting in increased hydraulic conductivity in the pack, combination of these, and the like.

As mentioned previously, fluid compositions suitable for use in the disclosure may comprise proppant. As further discussed herein, any type of proppant may be employed, including coated and non-coated proppants, and mixtures thereof. In certain methods of the disclosure the proppant may all be the same, or mixtures of at least two different proppants. For example, the proppant may have the same external surface or different external surface from one proppant particle to the other in the same fluid composition. Furthermore, the proppant core may be the same or different from one proppant particle to the other in the same fluid composition. Alternatively, methods of the disclosure may comprise injecting a first fluid composition within the disclosure, followed sequentially by at least one additional fluid composition within the disclosure, each fluid composition within the disclosure having a different proppant.

Additives suitable for use in the disclosure include fibers, which may be single-component fibers, multicomponent fibers, and mixtures thereof. Methods within the disclosure may comprise injecting fibers into a subterranean formation, either as an ingredient in a fluid composition of the disclosure, or in a separate composition.

Methods within the disclosure include methods of controlling (in certain embodiments, reducing or eliminating) particle and/or fluid flow between the subterranean wellbore and a subterranean formation. Certain methods of the disclosure are those wherein the controlling particle flow comprises reducing fines migration from the subterranean formation into the wellbore.

The various aspects of the disclosure will become more apparent upon review of the brief description of the drawings, the detailed description of the disclosure, and the claims that follow.

BRIEF DESCRIPTION OF THE DRAWINGS

For a more complete understanding of the features and advantages of the present disclosure, reference is now made to the detailed description of the disclosure along with the accompanying figures and in which.

Figure 1:
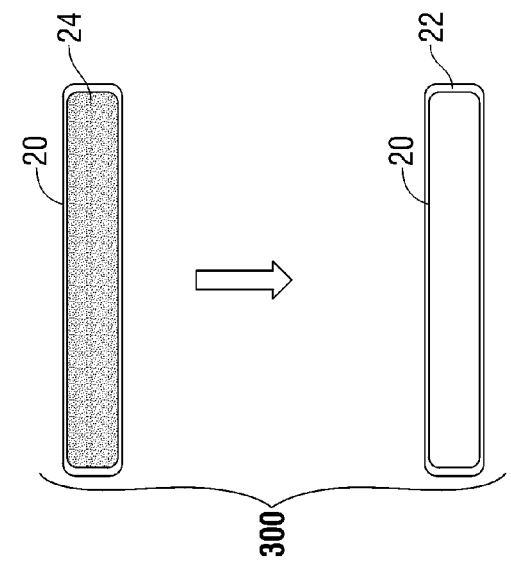
FIGS. 1-4 are schematic cross-sectional illustrations of exemplary embodiments of additives useful in certain methods of the disclosure.

It is to be noted, however, that FIGS. 1-5 of the appended drawings are highly schematic, not necessarily to scale, and illustrate only typical additive embodiments useful in certain methods of this disclosure, and are therefore not to be considered limiting of its scope, for the disclosure may admit to other equally effective embodiments.

DETAILED DESCRIPTION

In the following description, numerous details are set forth to provide an understanding of certain methods of the present disclosure. However, it will be understood by those skilled in the art that methods present disclosure may be practiced without these details and that numerous variations or modifications from the described embodiments may be possible.

One category of additive useful in the disclosure are proppant flowback control additives containing a degradable external surface. In this category are included fibers, films, rods, pellets, tablets, and beads used for proppant flowback control that comprise at least a portion of their external surface shape that degrades controllably in downhole conditions.

These additives will reinforce the strength of the proppant pack for a period of time and then a portion of, or all of their external surface shape may dissolve or sublime, or partially dissolve or sublime, in the oil/water/gas media in downhole conditions. Suitable degradable materials may be organic, inorganic, or combinations (mixtures) thereof. Examples of usable degradable organic materials are those that comprise aqueous phase-soluble polymers, for example polylactic acid, polyglycolic acid or copolymers thereof that are soluble in the aqueous phases in the subterranean environment. Other suitable degradable organic materials are oil-phase soluble materials, such as polystyrene and homologs thereof, derivatives of polystyrene and homologs thereof, and some low molecular weight polyolefin fibers and co-polymers thereof. Degradable organic materials useful in certain methods of the disclosure may comprise physical mixtures of at least two aqueous-phase soluble polymers, at least two oil-phase soluble polymers, and mixtures of at least one aqueous-phase soluble polymer and at least one oil-phase soluble polymers.

Yet other suitable additives having an organic degradable external surface shape, or portions thereof, are organic compounds, or mixtures thereof, that sublime at temperatures ranging from about 0° C. and higher in the presence of hydrocarbon gas streams. Example of these include camphor, naphthalene, benzaldehyde, mixtures thereof, and the like.

Salts of any of the above organic degradable additives may also be used.

Suitable inorganic degradable materials for use as modifiable external surface shape of additives in the disclosure include inorganic salts, for example, sodium chloride, potassium chloride, ammonium carbonate, ammonium perchlorate, mixtures thereof, and the like.

Embodiments within this category of additives useful in the disclosure may comprise a first component of the external surface shape of the additive that is substantially non-dissolvable when exposed to a selected wellbore environment, and a second component of the external surface shape that is soluble in the selected wellbore environment and whose rate and/or location of dissolution is at least partially controlled by structure of the first component.

The first component may be formulated to function to limit dissolution of the second component by limiting either the rate, location, or both rate and location of dissolution of the second material. Also, the first component may be capable of a wider temperature characteristic compared to the more soluble second component such that it is not subject to excessive degradation at extreme temperature by comparison. The first component may be structured in many ways to control degradation of the second component. For example, the first component may comprise at least one element embedded into a mass of the second component. The first component may be selected from polymeric materials, metals that do not melt in wellbore and fracture environments, materials soluble in acidic compositions, frangible ceramic materials, and composites. The first component may include fillers and other ingredients as long as those ingredients are degradable by similar mechanisms. Suitable polymeric materials for the first composition include natural polymers, synthetic polymers, blends of natural and synthetic polymers, and layered versions of polymers, wherein individual layers may be the same or different in composition and thickness. The term "polymeric material" includes composite polymeric materials, such as polymeric materials having fillers, plasticizers, and fibers therein. Suitable synthetic polymeric materials include those selected from thermoset polymers and non-thermoset polymers. Examples of suitable non-thermoset polymers include thermoplastic polymers, such as polyolefins, polyolefin copolymers, ionomers such as that market by E.I. DuPont de Nemours under the trade designation "SURLYN", polytetrafluoroethylene, polychlorotrifluoroethylene, and thermoplastic elastomers.

The second component functions to dissolve when exposed to the wellbore conditions in a user controlled fashion, i.e., at a rate and location controlled by the structure of the first component. In this way, fractures in the wellbore may be blocked for periods of time as defined by the user. The second component may comprise a water-soluble inorganic material, a water-soluble organic material, and combinations thereof. The water-soluble organic material may comprise a water-soluble polymeric material, for example, poly(vinyl alcohol), poly(lactic acid), and the like. The water-soluble polymeric material may either be a normally water-insoluble polymer that is made soluble by hydrolysis of side chains, or the main polymeric chain may be hydrolyzable.

Figure 2:
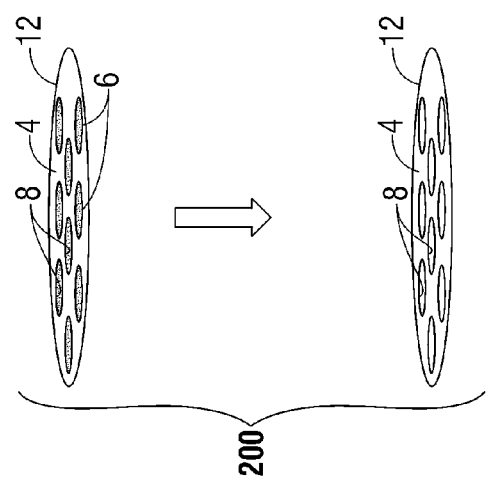
Figure 3:
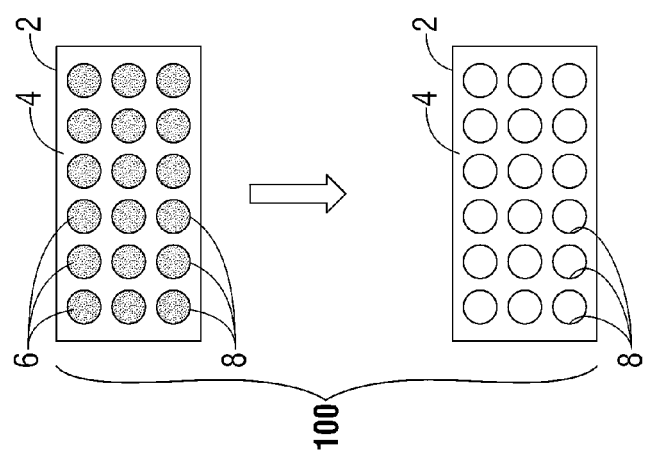

Example constructions of degradable additives are illustrated schematically in cross-section in FIGS. 1-4. FIG. 1 illustrates an embodiment 100 having a generally rectangular cross-section 2, and comprised of a first structural component 4 and a degradable component 6 filling a series of thru-holes 8. The arrow represents a transition from a first stage to a second stage, and as illustrated in FIG. 1 the degradable material has been removed by exposure to conditions sufficient to completely degrade the degradable component 6 using, for example, a chemical wash, leaving thru-holes 8 empty and available for passage of formation fluid. FIG. 2 illustrates an embodiment 200 having a generally rod-shaped or pellet-shaped cross-section 12. A series of degradable regions 6 are present in a corresponding series of thru-holes 8 in a matrix of a substantially non-degradable material 4. As in embodiment 100 of FIG. 1, degradable regions 6 of embodiment 200 are removed by exposing the additive to conditions sufficient to completely degrade material 6, leaving thru-holes 8 which allow passage of formation fluids into the well. FIG. 3 illustrates another useful additive embodiment 300 having a generally rectangular cross-section 20, and in which a large amount of degradable material 24 is encapsulated in a shell of relatively non-degradable material 22. Thus in embodiments 100, 200, and 300, the degradable materials are initially protected from the formation fluids by physical barriers and encapsulation. As these barriers are ruptured, or degraded, the soluble regions are exposed and can be produced back.

Figure 5:
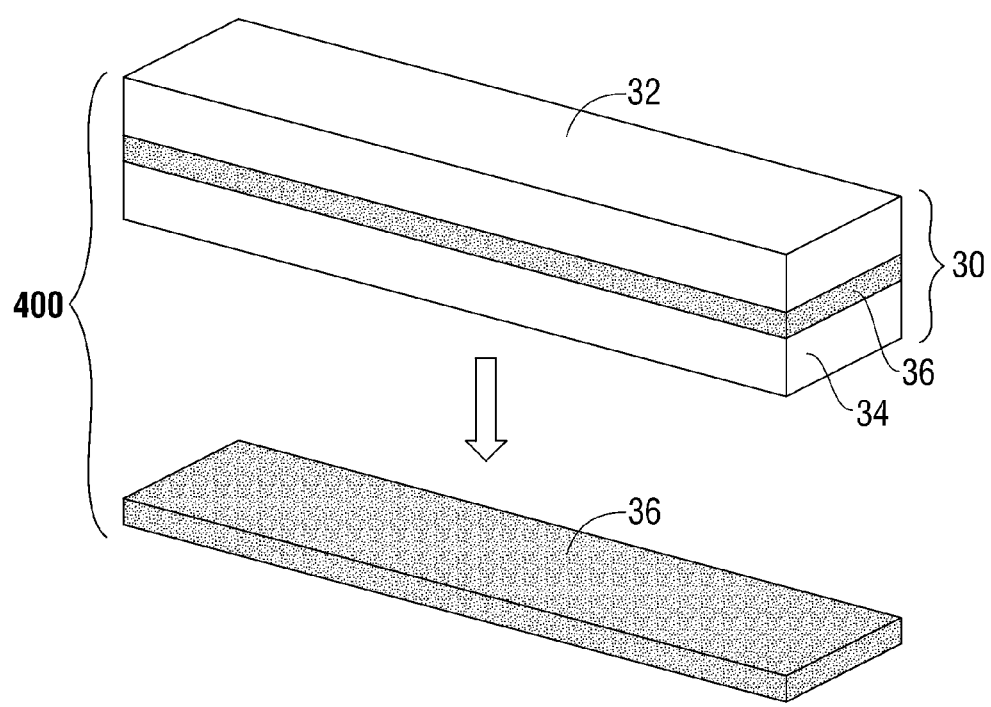
FIG. 5 is a schematic perspective view of another additive embodiment useful in certain methods of the disclosure.

In embodiments 100, 200, and 300 the degradable material complete degrades and dissolve over time, and this frees up the most pore space within the proppant pack. However, in some embodiments it would be beneficial if residual degradable material were left behind that had beneficial properties for the function of the proppant pack. For example, embodiment 400 of FIG. 5 illustrates that a composite additive 30, initially comprised of two degradable layers 32 and 34 sandwiching a layer 36, could leave behind, after exposure to conditions sufficient to degrade layers 32 and 34, a very thin film 36 of very tacky material that would help to minimize fines migration. In embodiment 400 of FIG. 5, the degradable external layers 32 and 34 provide "temporary" proppant flowback control by acting as a deformable material. When they decompose they open up pore space, and leave behind a tacky strip 36 that can act as a mat to prevent fines migration.

In alternative embodiments, the degrading material such as depicted in FIGS. 1-3 and 5 could release a curable resin that, when cured, stabilizes the sand pack after closure has taken place and stress cycling is minimized. Example of curable resins suitable for use in the disclosure are discussed herein below.

Additives suitable for use in the compositions and methods of the disclosure may be initially sized for proppant flowback prevention. For example, in the case of fibers and rod-shaped additives, these materials may have an aspect ratio greater than 5:1, with an optimum cross-sectional diameter of 5 micrometers or greater. If the additive is in the form of beads, the beads may be deformable and sized based on the proppant used. The size for beads or spherical additives would often be chosen to be close to the same size range as the proppant particles.

Figure 4:
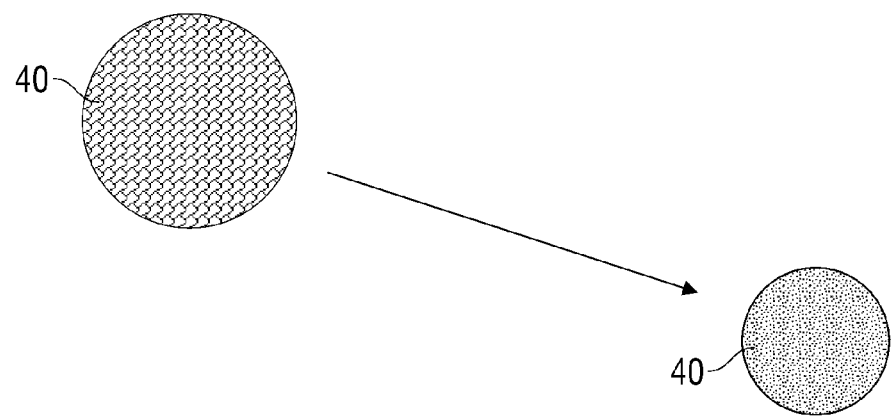

Another category of additives suitable for use in the disclosure are additives having an external surface able to swell and unswell in the presence of controllable conditions, such as well treatment fluids, and unswell over time when exposed to downhole environments or fluids deployed downhole, such as wash chemical compositions and the like. FIG. 4 illustrates two stages of a solvent-swellable additive 40. In certain embodiments such as the embodiment illustrated in cross-section in FIG. 4, the external surface shape comprises the entire additive. The left-hand side of FIG. 4 illustrates in cross-section the additive substantially swollen and therefore taking up a relatively large volume, which increase the proppant flowback efficiency of the additive. After controlled exposure to conditions that remove some of the solvent, the solvent-swelled additive is reduced in volume, as illustrated in the cross-section in the right-hand side of FIG. 4, which increases hydraulic conductivity. These additive embodiments may be termed swellable proppant flowback control additives. An example of additives of this type is additive particles comprising crosslinked polymeric beads swollen with a solvent suitable for the beads. These additives may be added to the well treatment fluid to make an appropriate proppant precursor composition before pumping the proppant precursor composition downhole. The polymeric beads may or may not be tacky when added to the well treatment fluid. If they are not tacky when added to the fluid they may become tacky over time after exposure to the treating fluid and or exposure to the formation temperature. After the proppant sets up in the fracture, the set proppant has maximum flowback prevention activity due to both the tacky nature of the swollen additive particle external surface shape and due to the physical interference of the relatively large particles which act as wedges to keep the particle grains in place. After placement of the proppant in the fracture, the solvent starts to wash away from the swollen additive particles, the additive particles shrink, releasing free space in the proppant pack and increasing hydraulic conductivity. Release of solvent from the swollen polymeric beads could be due to solvent dissolution into a liquid phase downhole, evaporation in a gas phase (or supercritical phase) under downhole conditions, or combination of these. For example, the solvent system can be chosen to be water soluble, as is the case for ethyl acetate in the example described above. In this case the material will clean up relatively fast, and will be useful for helping to control proppant flowback when the only problem occurs during the initial stages of flowback when the fracturing fluid is being recovered. Alternatively, a water insoluble solvent such as toluene could be chosen for situations where longer term proppant flowback is desired. In this situation the solvent (swelling agent) will not clean up until significant quantities of gas are produced.

Another advantage of these embodiments is that the swelling agent may be a chemical that improves the performance of the fracture, or that it contains a chemical that improves the performance of the fracture. The swelling agent may comprise a mutual solvent or surfactant that would assist in the clean up of residual fracturing fluid. Alternatively, the swelling agent may comprise a biocide or scale inhibitor that is slowly released.

One particular advantage of swellable proppant flowback control additives is that their properties may be tailored for optimum performance in a particular well or subterranean environment at a location proximate to the wellbore, such as a local operation base or at the site of the treatment.

Another category of additives suitable for use in the disclosure are additives comprising a dissolvable or otherwise removable external surface on proppant grains. Additives within this embodiment involve the use of an external surface composition that exhibits changeable tack properties (i.e. able to convert from a first tacky state to a non-tacky second state) on at least some of the external surface of some of the proppant particles. The second state can dissolve (in water or oil) or wash out.

Embodiments within these useful additives are those including a coated proppant, wherein the coating depolymerizes, is hydrolyzed, and/or dissolves at elevated temperature in the presence of water. Examples of these polymers include those discussed previously as water-soluble polymers, including poly(vinyl alcohol), poly(lactic acid), and the like. The water-soluble polymeric material may either be a normally water-insoluble polymer that is made soluble by hydrolysis of side chains, or the main polymeric chain may be hydrolyzable.

Tack is the property of a material that enables it to form a bond of measurable strength after it is brought into contact under pressure with another material. Tack is deemed a desirable property of external surfaces of certain additives useful in the disclosure for solids immobilization (solids migration control), as additives comprising an appropriately tacky external surface are thought to create a bond between solids, for example between the additive particles and fines, precipitates, and the like, and the walls fractures. The Dahlquist criterion for tack stipulates that at a given temperature the modulus of any tacky adhesive is less than $3 \times 10^6$ dynes/cm$^2$ ($3 \times 10^5$ N/m$^2$) at a frequency of about 1 Hz.

Polymers useful in producing microspheres using emulsion techniques are disclosed in U.S. Pat. Nos. 7,132,108 (Yang et al.) and 6,309,669 (Setterstrom et al.). Polymers disclosed therein include poly(lactide) (PLA), polyglycolide (PLG), poly(lactide-co-glycolide) copolymers (PLGA), polyethylene glycol (PEG), polyorthoesters, polyanhydrides and polyphosphoesters. Useful polymers are poly(lactide-co-glycolide) copolymers. Although the polymer can be all poly (lactide) or all polyglycolide, a blend of the two polymers (PLGA copolymers) may be used in exemplary embodiments, and that copolymer preferably has a composition which is within the range of about 65:35 to about 50:50. Suitable molecular weights of the polymers are within the range of about 10,000 to about 110,000. Desirably, the molecular weight is about 40,000 to about 75,000 for 50:50 compositions and about 10,000 to about 75,000 for 65:35 compositions. By varying the properties of the polymer (i.e., its composition, molecular weight, or its nature), one can affect the release rate, the proportion of modifier released by diffusion vs. degradation, and the overall release period. For example, varying the number average molecular weight of the PLGA or the content of lactide in the polymer affects the rate at which the microspheres will degrade. Increasing the glycolide content of a poly(lactide-co-glycolide) polymer and decreasing the number average molecular weight of the polymer can enhance the hydrolysis of the polymer and so provide increased modifier release from polymer erosion. Using higher number average molecular weights of PLGA (e.g., in the range of about 75,000 to about 110,000), or using a content of lactide to glycolide of at least about 75:25, the period of modifier release following the initial burst can be extended. However, a larger volume of internal aqueous solution desirably is used to achieve more porous microspheres which can still result in a desirable initial release even with PLGA polymers comprising a high content of polylactide to polyglycolide. Also, the degradation rate of the microspheres can be adjusted by using a combination of two different kinds of polymers. For example, the degradation rate of polycaprolactone (PCL) is much slower than that of PLGA; the degradation rate of PEG is much faster. Microspheres fabricated with a blend of PEG and PLGA will have a much faster degradation rate. Polyorthoesters and polyanhydrides also may also be used. Persons of skill in the art may design the composition of the polymeric matrix to have specific properties given the guidance provided herein. The pH of the microspheres produced by this method may range from about 5 to about 8. The formulations may comprise other components, provided that any such additional component does not interfere with the attach and release properties of the microspheres.

Certain additives useful in the disclosure are those wherein one or more of the components of the external surface, for example, a polymer, is functionalized, for example, acid functionalized, basic functionalized, and the like. As used herein the term "functionalized" means at least one of such moiety is present in a polymer molecule. In certain embodiments, the additives may have defined elasticity. In other embodiments, the additives may be designed to retain their shape up to a desired temperature, above which the additives, or at least the external surface thereof, deform. For example, a plurality of additive particles may deform to form a substantially continuous coating over the core outer surface. Other additives useful in the disclosure may comprise one or more hydrocarbons, such as a relatively low molecular weight normal, branched, or cyclic alkanes, alkenes, alkynes, and the like, as well as aromatic compounds such as toluene, xylene, styrene, divinylbenzene, and the like. Some of these, such as styrene and divinylbenzene, may react to form an oligomer within the external surface of the additive. Additives useful in the disclosure may have more than one of these features in a single additive particle. Furthermore, in any single additive particle useful in the disclosure, the additive particles may be substantially identical, or they may vary widely in composition and properties. Yet further, within any sample of a plurality of additives, the additive particles may be identical or vary widely in core composition, external surface composition, ratio of core to total radius of the additive particle including its external surface, and the like. For example, a certain portion of additive particles useful in the disclosure may comprise an external surface, or a portion thereof, that becomes tacky at a first temperature, and loses tackiness at a second temperature. Other examples will be apparent to those of skill in the art.

Regarding proppants suitable for use as solid additives in methods of the disclosure, the primary function of the proppant is to prop open fractures, and thus this component has resistance to crushing and fines generation, as defined by API standard tests. In certain embodiments, the proppant or proppant core may be sand or ceramic, while in certain embodiments, the proppant core may include a cured resin coating. The term "ceramic" as used herein includes glass, crystalline ceramic, glass-ceramic, and combinations and mixtures thereof. As one goal in hydrocarbon production operations is to reduce generation and production of fines, the crush resistance and hardness of the core is an important feature of the these additives, and is discussed more fully herein; it is expected, however, that suitable core materials may in fact include materials more likely to generates fines than defined in the API standards, since the liquid adhesive coating may act as "sinks" for any "core fines", that is, fines generated from crushing or scratching of the cores.

Suitable proppant cores include those comprising a material selected from sand, ceramic beads, glass microspheres, synthetic organic beads, resin coated proppant, and sintered minerals (for example, sintered alumina, sintered bauxite, and the like). Other materials may used, such as nut shells, aluminum, aluminum alloys, wood (e.g., wood chips), coke (e.g., crushed coke), slag (e.g., granulated slag), coal (e.g., pulverized coal), rock (e.g., crushed rock), metal (e.g., granules of steel), refractories (e.g., mullite), flint, garnet, diamond, silicon carbide, and the like. The proppant cores can be in any of a variety of shapes and sizes. The desired size and shape may depend, for example, on factors such as the proppant core material, the well fractures to be propped, the equipment to be used to inject the proppant articles into the well, and the carrier fluid used. For example, in some embodiments, the proppant cores may have a sphericity of less than about 0.9 (in some embodiments, less than about 0.7), as measured according to API Recommended Practice 56, American Petroleum Institute, 1995 (referred to hereafter as API RP 56).

Exemplary proppants and additive proppant cores (when used) typically will meet or exceed the standards for sphericity, roundness, size, turbidity, acid solubility, percentage of fines, and crush resistance as recited in API RP 56 for proppant. In these recommended practices, minimum standard for sphericity is as at least 0.6 and roundness at least 0.6, the terms "sphericity" and "roundness" as defined and determined using the procedures described in the API RP 56. API RP 56 also sets forth some commonly recognized proppant sizes as 6/12, 8/16, 12/20, 20/40, 30/50, 40/70, and 70/140 notes that a minimum percentage of particulates that should fall between designated sand sizes, noting that not more than 0.1 weight % of the particulates should be larger than the larger sand size and not more than a maximum percentage (1 weight % in API RP 56 and 2 weight % in API RP 58) should be smaller than the small sand size. Thus, for 20/40 proppant, no more than 0.1 weight should be larger than 20 U.S. Mesh and no more than 1 weight % smaller than 40 U.S. Mesh. API RP 56 describes the minimum standard for proppant turbidity as 250 FTU or less. API RP 56 describes the minimum standard for acid solubility of proppant as no more than 2 weight % loss when tested according to API RP 56 procedures for proppant sized between 6/12 Mesh and 30/50 Mesh, U.S. Sieve Series and as no more than 3 weight % loss when tested according to API RP 56 procedures for proppant sized between 40/70 Mesh and 70/140 Mesh, U.S. Sieve Series. API RP 56 describes the minimum standard for crush resistance of proppant as producing not more than the suggested maximum fines as set forth in Table 1 for the size being tested.

Proppants (and proppant cores, when used in additives) useful in the disclosure may range in size (largest dimension) from about 6/8 mesh to about 100 mesh (in some embodiments, from about 12/20 mesh to about 30/50 mesh). Proppant cores may be any shape, including spherical, hemispherical, pyramidal, rectangular (including cubed), cylindrical, tablet-shaped, pellet-shaped, and the like.

TABLE 1

Suggested Maximum Fines of Proppant Subjected to Crushing Strength

| Mesh Size (U.S. Sieve Series) | Crushing Force (lbs)[kg] | Stress on Proppant (psi)[MPa] | Maximum Fines (% by weight) |
|---|---|---|---|
| 6/12 | 6,283 [2,850] | 2,000 [13.8] | 20 |
| 8/16 | 6,283 [2,850] | 2,000 [13.8] | 18 |
| 12/20 | 9,425 [4,275] | 3,000 [20.7] | 16 |
| 16/30 | 9,425 [4,275] | 3,000 [20.7] | 14 |
| 20/40 | 12,566 [5,700] | 4,000 [27.6] | 14 |
| 30/50 | 12,566 [5,700] | 4,000 [27.6] | 10 |
| 40/70 | 15,708 [7,125] | 5,000 [34.5] | 8 |
| 70/140 | 15,708 [7,125] | 5,000 [34.5] | 6 |

EXAMPLES

Testing was performed on a sample chosen in order to provide proppant flowback prevention activity in a swollen state and be able to shrink and result in increasing permeability when solvent is removed. Proppant, in this case sand, was combined with a flowback control additive comprising a changeable material. A sample of crosslinked polystyrene microspheres having an unswollen mesh size of 50/70 (U.S. Sieve Series) and having approximately 1200 vol. % swell in the ethyl acetate and 1300 vol. % in toluene was used as a changeable material.

Example 1

Preparation of Acrylic Microspheres

A two liter, three necked flask equipped with a thermometer, mechanical stirrer and nitrogen inlet tube was charged with 428 grams of deionized water, 12.5 grams of ammonium lauryl sulfate (obtained from Stepan Chemicals, Northfield, Ill. under the trade designation "STEPANOL AMV"), 1 gram of poly(N-vinyl pyrrolidinone) (obtained from ISP Chemicals, Inc., Wayne, N.J. under the trade designation "PLASDONE K-90"), and 2.75 grams of sodium styrene sulfonate (obtained from Sigma-Aldrich).

To this solution was added a solution of 544 grams of isooctyl acrylate (obtained from 3M Company, St. Paul, Minn.), 2.75 grams of N-vinyl pyrrolidinone (obtained from ISP Chemicals, Inc.), 0.19 gram of bis(4-t-butyl cyclohexyl) peroxydicarbonate (obtained from AKZO Nobel, Chicago, Ill., under the trade designation "PERKADOX 16N) and 0.83 gram of benzoyl peroxide (70% (by weight) in water; obtained from Arkema Inc., Philadelphia, Pa., under the trade designation "LUCIDOL-70"). The reaction mixture was agitated at 340 revolutions per minute, heated to 46° C. and purged with nitrogen. The agitation and nitrogen purge was maintained throughout the reaction period. The reaction exothermed after a few minutes and peaked at 90° C. The batch was maintained at 75° C. for 4 hours, cooled and filtered through a cheese cloth. The resulting polystyrene microspheres had a mean volume diameter of 45 micrometers. The Tg of the microspheres was calculated using the Fox equation to be −46° C.

Example 2

Preparation of Polystyrene Microspheres

To a 2 liter resin flask was added 900 grams of deionized water and 4.5 grams of polyvinyl alcohol (obtained from Celanese Corporation, Dallas, Tex. under the trade designation "CELVOL 350"). The mixture was heated to 90° C. under nitrogen with agitation for 30 minutes. The reactor was cooled to 75° C. and the following monomer mixture was added: 135 grams of styrene (obtained from Sigma-Aldrich), 1.5 gram of divinylbenzene (obtained from Sigma-Aldrich), 133.5 grams of isooctyl acrylate (obtained from the 3M Company), 30 grams of methacrylic acid (obtained from Sigma-Aldrich), and 0.30 gram of azobis-2-methylbutyronitrile (obtained from DuPont, Wilmington, Del. under the trade designation "VAZO 67"). The reaction was maintained at 75° C. with stirring for 16 hours whereupon it was heated to 105° C. for 2 hours with distillation of unreacted monomer. The product was cooled and filtered through cheesecloth and washed to provide beads having a particle size from about 100 to 400 micrometers. These beads had a glass transition temperature of 110° C. as measured by differential scanning calorimetry.

Proppant Pack Stability Measurements

Proppant pack stability measurements were performed in a proppant flowback apparatus having the following assemblies: a flowback cell to contain the sand or proppant pack being tested, a circulation system to pump water through the proppant pack in the cell, and a hydraulic press to apply a uniaxial closure stress onto the proppant pack in the cell. The flowback cell had a rectangular body with an interior 5.25 inch×5.25 inch (13.3 cm×13.3 cm) working area in which the proppant pack was placed. After the proppant pack was placed in the cell, a square piston was inserted into the body on top of the proppant pack. Water was pumped through the rectangular proppant pack from an upstream inlet side through to the discharge side. There were three 13 mm inlets for the inflow of water on the upstream side of the cell and there was a 10 mm outlet (that represents a perforation) on the downstream side of the cell. Thus the sandpack was free to move within the cell if it had insufficient strength to withstand the stresses generated by the flow of water. After the flowback cell was filled and assembled, it was placed in the hydraulic press which then applied the designated closure stress to the proppant pack. The system was equipped with computer control and data acquisition to measure pack width, flow rate and upstream pressure. The total mass of the solids in the pack (sand plus flowback control additives) was set at 400 grams. The uniaxial closure stress was set to 4000 psi (27.6 MPa), and the tests were performed at 90° C. At the start of each test the flow rate of water was zero. As the test progresses the flow rate of water was continuously increased at a rate of 4 L/min·2 until pack failure was observed. The flow rate of water at the pack failure was used as a characteristic of the flowback stability of the proppant pack.

Example 3

Polystyrene Microspheres Swollen with Toluene

A test was performed with a sample of the polystyrene microspheres of Example 2 to test their efficacy in flowback prevention, and to investigate their unswelling/shrinkage properties. A sample of the polystyrene microspheres were swollen in toluene (1300% of swelling=swollen/dry weight) and tested for flowback prevention activity. The strength of proppant pack was measured as a flow rate when the pack breaks and proppant went out of the cell. Pure fracturing sand of 20/40 mesh (in accordance with API RP 56) obtained from Badger Mining Corporation, Berlin, Wis., was used as a baseline. It was found that a pack of 400 grams of pure sand loaded in the described test using uniaxial closure stress of 4000 psi (27.6 MPa) at 90° C. broke at flow rate less than 0.5 l/min. Addition of 7.6 vol. % (0.25 wt % of dry material) of the toluene-swollen polystyrene microspheres lead to increased stability up to 3.25 l/min.

Example 4

Polystyrene Microspheres Swollen with Ethyl Acetate

Figure 6:
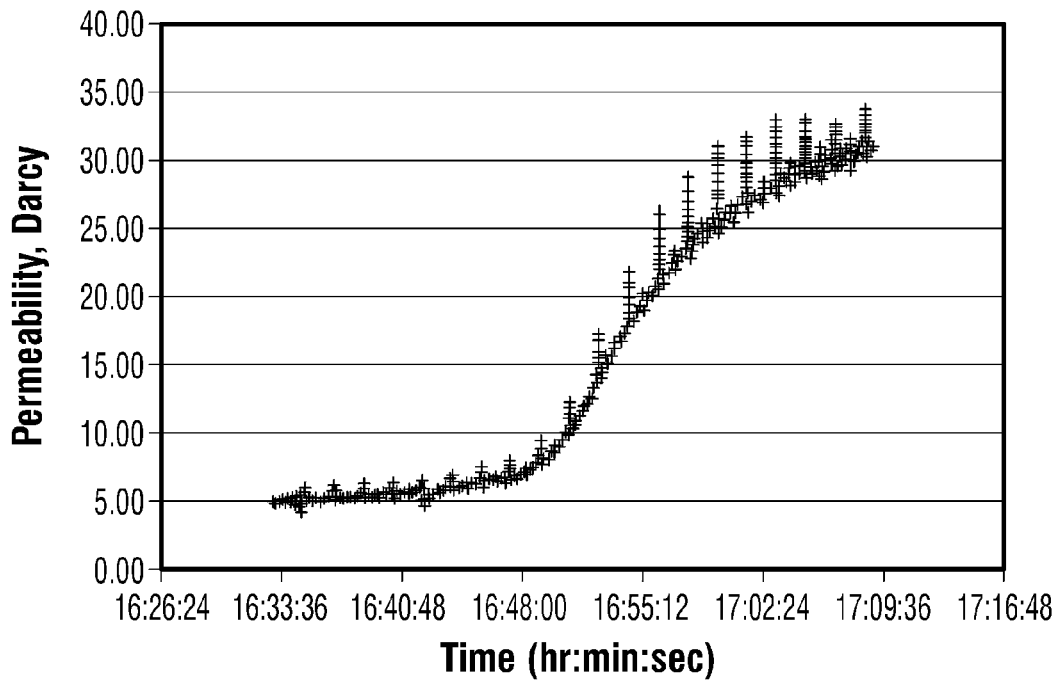
FIG. 6 is a graphical illustration of hydraulic conductivity test results with a standard sand having therein a swellable/deswellable additive useful in certain methods of the disclosure.

A sample of the same polystyrene beads as produced in Example 2 was swollen in ethyl acetate, a water soluble solvent (swelling 1200%). The volume concentration of swollen microspheres was 30% (1 wt % of dry polymer). Permeability properties for the polystyrene beads were measured in a Hassler sleeve type conductivity apparatus at room temperature (about 25° C.) and 1500 psi (10.3 MPa) closure stress. Initial permeability of 5 Darcy increased up to 31 Darcy in 30 minutes. FIG. 6 illustrates these results graphically, showing that by gradually removing solvent from swollen polystyrene beads over time increased porosity of the pack.

Example 5 and Comparative Examples A and B

One sample comprising pure sand proppant, and two samples containing polystyrene microspheres were prepared. Comparative Example A was 400 grams of pure fracturing sand of 20/40 mesh (API RP 56) obtained from Badger Mining Corporation, Berlin, Wis. Comparative Example B was prepared by mixing of 396 grams of the same sand with 4 grams of the unswollen polystyrene microspheres made in Example 2. Example 5 comprised 396 grams of the same sand, 4 grams of the unswollen polystyrene microspheres made in Example 2, and an additional 100 grams of ethyl acetate to swell the microspheres.

The dry, unswollen materials did not show any marked proppant flowback prevention activity. For instance there was no difference in the stability of Comparative Examples A and B; the pure sand pack of Comparative Example A was very unstable and failed at flow rate as low as 0.5 l/min, while the sand pack of Comparative Example B (containing 1 wt. % of 50/70 U.S. Mesh dry polymer additive) broke at the same 0.5 l/min. flow rate.

In Example 5, the ethyl acetate-swollen polystyrene microspheres increased in volume and joined the sand particles. The proppant flowback stability increased from 0.5 l/min. up to 12.3 l/min. for Example 5. These results showed that a crosslinked polystyrene powder sample of Example 2, having 50/70 mesh size, and having approximately 1200 vol. % swell in ethyl acetate was useful as changeable material for the flowback control additive.

Proppant Pack Permeability Measurements

For Example 5, the proppant pack permeability measurements were performed in a modified API conductivity apparatus. A modified API conductivity cell was used. The proppant pack was placed between two Ohio sandstone cores in the cell. Three pressure ports along the cell were used for differential pressure measurements. The permeability was measured under 2000 psi (13.7 MPa) closure stress, achieved at 100 psi/min. (0.7 MPa/min.) loading rate. Differential pressure measurements were done at three different flow rates in the range 1-9 milliliter/min. Permeability measurements were performed at 25° C. The loading of 9.77 kg/m$^2$ (2 lbm/ft$^2$) was used for the measurements.

Hydraulic Conductivity of the Proppant Pack with the Swollen Polymer

The sample having swollen polymer beads (Example 5) had a significantly larger volume than the sample (Comparative Example B) having unswollen beads. This increase in effective volume of the flowback agent significantly suppressed the permeability of the proppant pack due to partial plugging of pore throats. However, the solvent used for polymer swelling, ethyl acetate in this experiment, is water miscible and was extracted from swollen polymer by the flowing water. The removal of the solvent from the swollen polymer resulted in shrinkage of the flowback control agent. This resulted in an increase in permeability over time.

Figure 7:
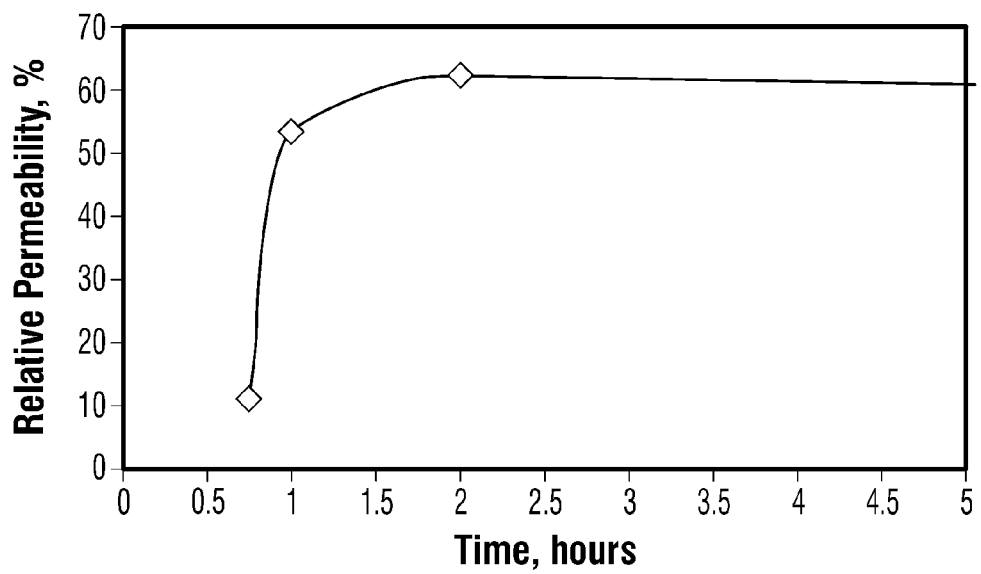
FIG. 7 is a graphical illustration of relative permeability of a standard sand having therein a swellable/deswellable additive useful in certain methods of the disclosure compared to sand without the additive.

The permeability measurement for the sand pack with swollen flowback control agent (Example 5) was performed over 60 hours. A conventional fracture conductivity test was run using a modified API conductivity cell. A 2% KCl brine was pumped at 3 milliliters/min. through the proppant pack. The relative (compared to pure sand sample of Comparative Example A) permeability restore with 1 wt. % of polymer in a swollen state versus the time of washing pack with 2% KCl at 3 mL/min. rate is presented in FIG. 7.

The initial permeability of the sample of Example 5 was low but increased quickly up to 60 of permeability of pure sand (Comparative Example A) in 2 hours. Additional flow through the pack of Example 5 did not increase the permeability over a period of 60 hours.

The methods of the present disclosure may be used in wells in which preferential flowpaths are produced using any one of a variety of techniques that yield desired fractures in the underground rock formations (e.g., hydraulic fracturing) as well as etching (e.g., acid etching). As used herein "wellbore servicing" means any operation designed to increase hydrocarbon recovery from a reservoir, reduce non-hydrocarbon recovery (when non-hydrocarbons are present), or combinations thereof, involving the step of pumping a fluid into a wellbore, or into tubing that is or will be placed into the wellbore. This includes pumping fluid into a reeled or spooled coil of coiled tubing. The fluid pumped may be a composition to increase the production of a hydrocarbon-bearing zone, a composition pumped into other zones to block their permeability or porosity, a composition designed to flush or cleanout a wellbore or portion thereof, and the like. Methods of the disclosure may include pumping fluids to stabilize sections of the wellbore to stop sand production, for example, or pumping a cementitious fluid down a wellbore, in which case the fluid being pumped may penetrate into the completion (e.g. down the innermost tubular and then up the exterior of the tubular in the annulus between that tubular and the rock) and provide mechanical integrity to the wellbore. As used here in the phrases "treatment" and "servicing" are thus broader than "stimulation". In many applications, when the rock is largely composed of sandstones, the stages include proppant or additional materials added to the fluid, so that the pressure of the fluid fractures the rock hydraulically and the proppant is carried behind so as to keep the fractures from resealing. The details are covered in most standard well service texts and are known to those skilled in the well service art so are omitted here.

Commonly, a fracturing fluid is used to initiate and propagate fractures and to transport a proppant to hold the walls of the fracture apart after the pumping has stopped and the fracturing fluid has leaked off or flowed back. Many known fracturing fluids comprise a water-based carrier fluid, a viscosifying agent, and the proppant. The viscosifying agent is often a cross-linked water-soluble polymer. As the polymer undergoes hydration and crosslinking, the viscosity of the fluid increases and allows the fluid to initiate the fracture and to carry the proppant. Another class of viscosifying agent is viscoelastic surfactants ("VES's"). Both classes of fracturing fluids (water with polymer, and water with VES) can be pumped as foams or as neat fluids (i.e., fluids having no gas dispersed in the liquid phase). Foamed fracturing fluids typically contain nitrogen, carbon dioxide, or mixtures thereof at volume fractions ranging from 10% to 90% of the total fracturing fluid volume. The term "fracturing fluid," as used herein, refers to both foamed fluids and neat fluids. Non-aqueous fracturing fluids may be used as well.

A variety of aqueous and non-aqueous well treatment fluids may be used in the present disclosure. Illustrative examples of water based fluids and brines which are suitable for use with the present disclosure include fresh water, sea water, sodium chloride brines, calcium chloride brines, potassium chloride brines, sodium bromide brines, calcium bromide brines, potassium bromide brines, zinc bromide brines, ammonium chloride brines, tetramethyl ammonium chloride brines, sodium formate brines, potassium formate brines, cesium formate brines, and any combination thereof.

Illustrative examples of water based polymer and polymer-containing treatment fluids suitable for use with the present disclosure include any such fluids that can be mixed with the previously mentioned water based fluids. Specific water based polymer and polymer-containing treatment fluids for use with the present disclosure include guar and guar derivatives such as hydroxypropyl guar (HPG), carboxymethylhydroxypropyl guar (CMHPG), carboxymethyl guar (CMG), hydroxyethyl cellulose (HEC), carboxymethylhydroxyethyl cellulose (CMHEC), carboxymethyl cellulose (CMC), starch based polymers, xanthan based polymers, and biopolymers such as gum Arabic, carrageenan, and the like, as well as any combination of the above-mentioned fluids.

Illustrative examples of non-aqueous treatment fluids suitable for use in the present disclosure include alcohols such as methanol, ethanol, isopropanol, and other branched and linear alkyl alcohols; diesel; raw crude oils; condensates of raw crude oils; refined hydrocarbons such as gasoline, naphthalenes, xylenes, toluene and toluene derivatives, hexanes, pentanes, and ligroin; natural gas liquids, gases such as carbon dioxide and nitrogen gas, and combinations of any of the above-described non-aqueous treatment fluids. Alternatively, mixtures of the above non-aqueous fluids with water are also envisioned to be suitable for use with the present disclosure, such as mixtures of water and alcohol or several alcohols. Mixtures can be made of miscible or immiscible fluids.

Fluid compositions useful in the disclosure may include at least one breaker material. In this regard, any suitable breaker known in the well treating art may be employed in a polymer treatment fluid. Examples of suitable breaker materials include enzymes and/or one or more oxidative breakers known in the well treating industry. Specific examples of suitable oxidative breakers include encapsulated breakers, such as encapsulated potassium persulfate. Other suitable breakers which may be employed in a polymer treatment fluid include conventional oxidative breakers, such as ammonium peroxydisulfate. Typically, such breakers are included in a polymer treatment fluid in a concentration of between about 0.1 lb/1000 gal. (10.3 g/m$^3$) and about 10 lb/100 gal. (1031.8 g/m$^3$). Most typically a conventional oxidative breaker is employed with an enzyme pre-treatment fluid comprising a polymer specific enzyme. The second fluid can also be heavily laden with breakers, water and/or scale control additives, paraffin control additives or other chemical components.

Optionally, the compositions may include other materials, including fibers, rheology modifiers, surfactants (including the previously mentioned VES systems), and the like. Fibers may be employed in fluid compositions of the disclosure, as taught in U.S. Pat. Nos. 5,330,005 (Card et al.); 5,439,055 (Card et al.); 5,501,275 (Card et al.); and 6,172,011 (Card et al.), all incorporated herein by reference. The addition of fibers in intimate mixtures with particulates for fracturing and gravel packing decreases the undesirable flowback of proppant or formation fines while stabilizing the sand pack and lowering the demand for high polymer loadings in the placement fluids. Fibers are useful for forming a porous pack in the subterranean formation. In some cases, channels or fingers of void spaces with reduced concentrations of proppant may be introduced into the proppant pack.

Fibers may be selected from natural and synthetic fibers, inorganic fibers, and mixtures of these fibers. Fiber length, thickness, density and concentration are important variables in the success of preventing proppant flowback. Fiber length may range upwardly from about 2 millimeters, fiber diameter from about 3 to about 200 micrometers. There appears to be no upper limit on the length of the fibers employed from the standpoint of stabilization. However, practical limitations of handling, mixing, and pumping equipment currently limit the practical use length of the fibers to about 100 millimeters. Fibrillated fibers can also be used and the diameters of the fibrils can be significantly smaller than the aforementioned fiber diameters. The fiber level used in the proppant pack can range from 0.01% to 50% by weight of the proppant cores, or from 0.1% to 5.0% by weight of proppant cores. The fiber can have a variety of shapes ranging from simple round or oval cross-sectional areas to more complex trilobe, figure eight, star shaped, rectangular cross-sectional areas or the like. Most commonly, straight fibers are used. Curved, crimped, spiral-shaped and other three dimensional fiber geometries are useful. Likewise, the fibers may be hooked on one or both ends. They may be of a composite structure, for example, a glass fiber coated with resin to increase fiber-fiber adhesion. The fibers may be of glass, ceramic, carbon, natural or synthetic polymers or metal filaments. Mixtures of these fibers may also be advantageously employed. Glass, carbon and synthetic polymers are used for their low cost and relative chemical stability. Glass fibers may be used due to their relatively low cost, easy availability and high stiffness. Because of the fact that placement fluids and subterranean formation fluids tend to have an alkaline pH, an alkaline resistant glass (hereinafter AR-glass) having a high zirconium content may provide good attributes. The use of more common, commercially available silica glasses is possible but the solubility of these glasses in an alkaline medium, particularly at elevated temperatures, may affect the long term stability of the fiber/proppant mixture over its lifetime in the wellbore.

Other exemplary fibers include multicomponent fibers which have been developed as binders for the nonwoven fabrics business. Some examples include: a) a segmented fiber comprised of about 70 percent high density polyethylene/30 percent polyethylene terephthalate; and b) a core-sheath fiber composed of two polyester resins, marketed under the trade designation "KOSA T-259", by KoSa, Salisbury, N.C.

In the oilfield context, a "wellbore" may be any type of well, including a producing well, a non-producing well, an injection well, a fluid disposal well, an experimental well, an exploratory well, and the like. Wellbores may be vertical, horizontal, deviated some angle between vertical and horizontal, and combinations thereof, for example a vertical well with a non-vertical component. In an implementation of the methods of the present disclosure, a wellbore treatment is designed considering characteristics of the target subterranean formation, desired outcome resulting from contacting the formation with the fluid composition, chemistry and characteristics of the fluid composition, well-bore geometry, and equipment to be used to inject the fluid composition to determine the appropriate concentration and type of components to use in the methods described herein.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims.

What is claimed is:

1. A method of completing a wellbore comprising:
   (a) injecting a well treatment composition into the wellbore, the composition comprising a well treatment fluid and an additive, the additive in the composition having an external surface shape;
   (b) modifying at least one property of the external surface shape of the additive after injecting the composition into the wellbore by controlling a parameter.

2. The method of claim 1 wherein the least one property is selected from the group consisting of dissolution rate, sublimation pressure, solubility, vapor pressure, percent crystallinity, volume, shape, density, porosity, modulus, viscosity, tackiness, degree of hydrolysis, chemical functionality, and combinations thereof.

3. The method of claim 1 wherein the additive is a composite additive selected from combinations of at least two chemical components, combinations of at least two phases of the same component, and combinations of at least two phases of at least two components.

4. The method of claim 1 wherein the modifying of at least one property of the external surface shape of the additive after injecting the composition into the wellbore by controlling a parameter comprises exposing the additive to at least one condition selected from the group consisting of: washing by solution having a controllable flow rate or a controllable composition or both; upon passage of at least one controlled time period; upon controlled application of heat; upon controlled application of pressure; upon controlled modification of treatment fluid; upon exposure to formation fluid; simultaneous combinations thereof; and sequential combinations thereof.

5. The method of claim 1 wherein the additive comprises a solvent.

6. The method of claim 5 wherein the additive is at least partially swollen by a solvent.

7. The method of claim 5 further wherein the swelling of the additive is reduced by removal of at least a portion of the solvent.

8. The method of claim 1 wherein the composition comprises proppant.

9. A method of treating a subterranean formation intersected by a wellbore, comprising:
   (a) providing a well treatment composition comprising a well treatment fluid and an additive, the additive in the composition having an external surface shape;
   (b) injecting the well treatment composition into a wellbore;
   (c) contacting the subterranean formation with the well treatment composition; and
   (d) modifying at least one property of the external surface shape of the additive after injecting the composition into the wellbore by controlling a parameter,
   wherein after first modifying the at least one property, further modifying a property of the external surface shape of the additive, and further wherein the property after the further modification is substantially the same as prior to the first modification.

10. The method of claim 9 wherein the modifying of at least one property of the external surface shape of the additive after injecting the composition into the wellbore by controlling a parameter comprises exposing the additive to at least one condition selected from the group consisting of: washing by solution having a controllable flow rate or a controllable composition or both; upon passage of one or more controlled time periods; upon controlled application of heat; upon controlled application of pressure; upon controlled modification of treatment fluid; upon exposure to formation fluid; simultaneous combinations thereof; and sequential combinations thereof.

11. The method of claim 9 wherein the additive is a composite material.

12. The method of claim 9 wherein the additive comprises a solvent, and the modifying the additive comprises exposing a solvent-swelled additive to a fluid able to remove at least a portion of the solvent.

13. The method of claim 9 wherein the formation comprises a formation fluid and exposure to the formation fluid modifies the additive.

14. A method comprising:
   (a) providing a well treatment fluid comprising a liquid component and a solid component;
   (b) combining the well treatment fluid with an additive to form a well treatment composition, the additive in the composition having an external surface shape;
   (c) injecting the well treatment composition into a wellbore, the wellbore intersecting a subterranean formation;
   (d) forming a pack comprising the solid component and the additive at a desired location in the wellbore or formation; and
   (e) modifying at least one property of the external surface shape of the additive after injecting the composition into the wellbore by controlling a parameter,
   wherein the additive is a composite additive selected from at least one of at least two phases of the same component, combinations of at least two phases of at least two components, and combinations thereof.

15. The method of claim 14 wherein after first modifying the at least one property, further modifying a property of the external surface shape of the additive, wherein the property after the further modification is substantially the same as prior to the first modification.

16. The method of claim 14 wherein the additive comprises a solvent.

17. The method of claim 16 further wherein the modifying comprises removal of at least a portion of the solvent.

18. The method of claim 14 wherein the additive comprises a trigger, and wherein modifying occurs upon exposure to a triggering mechanism.

19. The method of claim 14 wherein the well treatment fluid is a fracturing fluid, the step of injecting is performed at a pressure sufficient to create fractures in the subterranean formation, the solid component comprise proppant, and the pack is a proppant pack formed in at least one fracture.

20. The method of claim 14 wherein the well treatment fluid is a gravel pack fluid and the pack is a gravel pack formed at a desired location in the wellbore or a near wellbore region.

* * * * *

UNITED STATES PATENT AND TRADEMARK OFFICE
CERTIFICATE OF CORRECTION

PATENT NO. : 8,281,857 B2  
APPLICATION NO. : 12/808115  
DATED : October 9, 2012  
INVENTOR(S) : Willberg et al.

It is certified that error appears in the above-identified patent and that said Letters Patent is hereby corrected as shown below:

On the Title Page, item (56): Column 2, Under "Other Publications" move to the next line the entry --"ASTM Designation: D3418-03, "Standard Test Method for Transition Temperatures of Polymers by Differential Scanning Calorimetry", 2004 pp.331-337."--;

In the Specifications:

At column 12, line 47 delete "0.1 weight" and insert --0.1 weight %--;

At column 16, line 24 delete "60" and insert --60%--;

In the Claims:

At column 19, claim 4, line 34, delete "consisting of washing" and insert --consisting of: washing--.

Signed and Sealed this  
Second Day of July, 2013

Teresa Stanek Rea  
*Acting Director of the United States Patent and Trademark Office*